Oct. 3, 1933.  R. K. SCHMID ET AL  1,929,040
SKINNING APPARATUS
Filed May 20, 1930
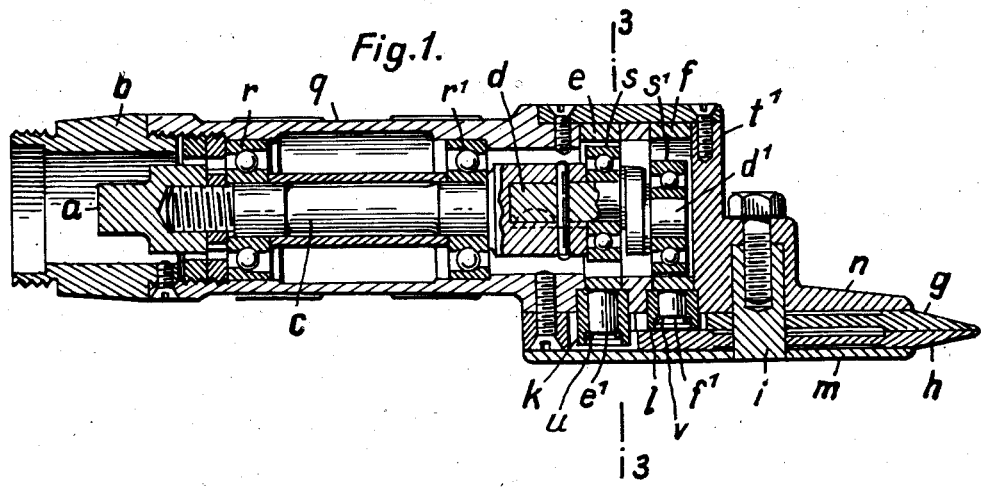
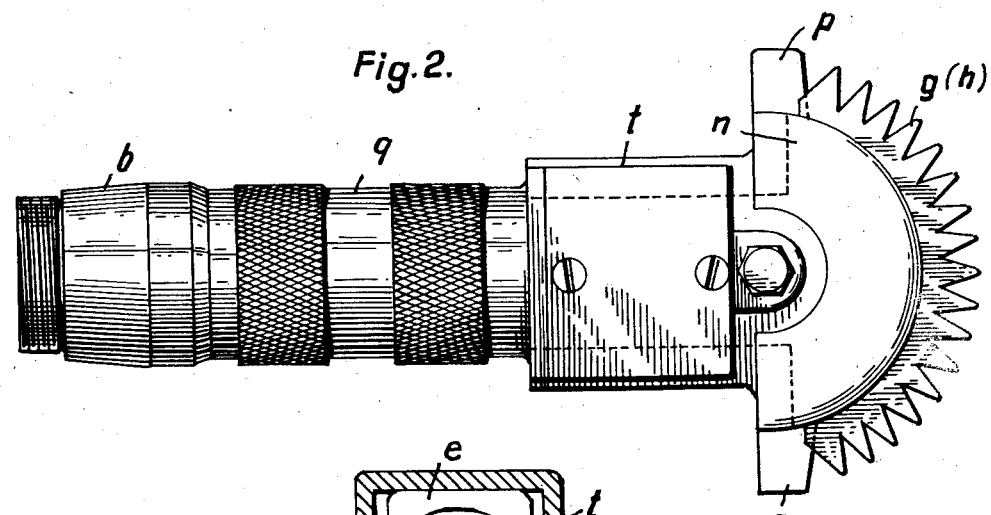
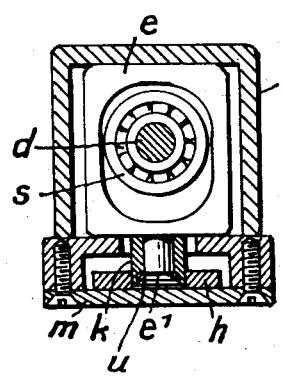
INVENTORS
R. K. Schmid and W. P. Wezel
by C. T. Goepel
their Attorney.

Patented Oct. 3, 1933

1,929,040

UNITED STATES PATENT OFFICE 1,929,040

SKINNING APPARATUS

Richard Karl Schmid and Walter Paul Wezel, Stuttgart, Germany

Application May 20, 1930, Serial No. 453,998, and in Germany March 20, 1930

2 Claims. (Cl. 17—22)

It is the main object of our present invention to perform a rapid operation and a further object is to so construct the apparatus that any risk of damage to the skin is avoided.

The driving of the apparatus is by means of a flexible shaft. It is well known to drive by a flexible-shaft apparatus having rotating knives or cutters, in which the cutting-in is prevented by protective or guard discs arranged at both sides of the knives. Apparatus are also known which have rotating toothed discs or jagged discs in which one disc makes an oscillating or rocking movement while the other one stands still.

According to our invention two superposed jagged or toothed discs or plates are moved relatively to each other, whereby a greater output is obtained; and by using a shape designed for the purpose for the jagged or toothed discs or plates, all risk of injury to the skin is eliminated in a reliable manner.

Our invention also comprises certain further details explained in the following description.

A construction according to the invention is shown by way of example in the accompanying drawing, in which Figure 1 is a vertical longitudinal section through the centre of the apparatus, Figure 2 a plan and Figure 3 a section on the line 3—3 of Figure 1.

The flexible shaft already referred to is connected to the handle by means of a claw coupling, that is to say, the core has a claw thereon which fits the mount $a$, while the tube or casing is screwed on the thread of the part $b$ by means of a screw cap. The core of the shaft drives the spindle $c$ held by ball bearings $r$ and $r^1$ within the cylindrical hand piece $q$ and which is provided at its end with a small floating crank-shaft $d, d^1$. On the said crank-shaft are mounted two ball bearings $s$ and $s^1$, which support slot links $e$ and $f$. The slot links $e$ and $f$ engage with the two jagged or toothed discs or substantially semicircular plates $g$ and $h$, which are rotatable about the bearing pin $i$ to an angle corresponding to the eccentricity of the crank-shaft.

In order to avoid the wearing-out of the slot link pins, in the part in front of the toothed discs are inserted hardened bushings $k$ and $l$, which are held in place by rings $u$ and $v$, lodged in notches $e^1$ and $f^1$. The toothed discs are covered on both sides with non-toothed guard discs $m$ and $n$; the protective or guard disc $n$ being made if desired in one piece with the front plate $t^1$ of the casing $t$.

Owing to the teeth of the toothed or jagged discs moving or oscillating relatively to each other at an angle, the skin cannot be injured. Any injury that may occur is caused only at the two ends of the discs. In order however to avoid this, the non-toothed protective disc or guard $n$ is provided with two lugs $o$ and $p$ at the points where the teeth of the toothed discs stop. These lugs may be provided also on the protective disc $m$ or on both protective discs $m$ and $n$.

Unlike in the hitherto known apparatus with two fixed jagged or toothed protective discs and with a toothed cutting knife rocking between them, in the construction hereinbefore described, with two toothed discs swinging relatively to each other with the projections of the discs moving at an angle to each other, the speed of cutting is increased by the movement of the discs relatively to each other with their projections moving at an angle relative to each other, to twice that of the apparatus hitherto known. The binding tissue between the skin and the flesh is exceedingly elastic and yielding, so that the speed of skinning is of substantial importance as regards the output.

What I claim is:

1. In animal skinning apparatus having a casing, the improvement comprising a pair of superposed substantially semi circular plates having a notched contour thereon forming blunt-shaped teeth extending therefrom, each plate lying in flush face-to-face contact, and adapted to be oscillated, one relatively of the other, a pin bar in the casing for centrally pivoting said plates, whereby the notched contour of one plate is angular to the contour of the other plate upon relative oscillation of the plates, means in connection with the plates for relatively oscillating the same, and a lug guard at each end of the notched contour of the plates fixed to the casing to prevent cutting of the skin of animals during the skinning of the same.

2. In a skinning apparatus having a casing and a flexible drive shaft, the improvement comprising two substantially semicircular plates adapted to be oscillated one relatively to the other, having V-shaped teeth forming blunt projecting jagged ends and making a flush sliding contact at their adjacent faces and having coextensive peripheral portions, a pin bar in the casing for the plates for pivoting the same, means in connection with the shaft for oscillating one plate relatively with the other to present the ends of the plate angularly to each other, for skinning animals without cutting the meat or skin portion thereof, and oppositely disposed slotted guard means extending laterally of the longitudinal axis of the casing accommodating each end of the semicircular plate to prevent damage to the skin and meat during the skinning operation.

RICHARD SCHMID.
WALTER WEZEL.